United States Patent
Lecocq et al.

(10) Patent No.: US 11,337,442 B2
(45) Date of Patent: May 24, 2022

(54) METHOD FOR THE VALORISATION OF YEAST BIOMASS RESULTING FROM THE PRODUCTION OF ETHANOL

(71) Applicant: Roquette Freres, Lestrem (FR)

(72) Inventors: Aline Lecocq, Bethune (FR); Christian Delporte, Anhiers (FR)

(73) Assignee: Roquette Freres, Lestrem (FR)

( * ) Notice: Subject to any disclaimer, the term of this patent is extended or adjusted under 35 U.S.C. 154(b) by 770 days.

(21) Appl. No.: 15/526,709

(22) PCT Filed: Nov. 16, 2015

(86) PCT No.: PCT/FR2015/053088
§ 371 (c)(1),
(2) Date: May 12, 2017

(87) PCT Pub. No.: WO2016/075422
PCT Pub. Date: May 19, 2016

(65) Prior Publication Data
US 2017/0339979 A1   Nov. 30, 2017

(30) Foreign Application Priority Data

Nov. 14, 2014   (FR) ..................................... 1461022

(51) Int. Cl.
*A23K 10/38* (2016.01)
*A23K 50/20* (2016.01)
*A23K 50/42* (2016.01)

(52) U.S. Cl.
CPC .............. *A23K 10/38* (2016.05); *A23K 50/20* (2016.05); *A23K 50/42* (2016.05); *Y02P 60/87* (2015.11)

(58) Field of Classification Search
CPC ....... Y02P 60/873; A23K 10/38; A23K 50/20; A23K 50/42
See application file for complete search history.

(56) References Cited

U.S. PATENT DOCUMENTS

| | | |
|---|---|---|
| 2,698,826 A | 1/1955 | Peltzer, Sr. |
| 3,236,740 A | 2/1966 | Smith et al. |
| 4,361,651 A | 11/1982 | Keim |
| 2006/0251762 A1* | 11/2006 | Jansen ...................... C12P 7/06 426/28 |
| 2008/0089978 A1* | 4/2008 | Grigg ....................... A23P 20/12 426/61 |
| 2010/0173358 A1* | 7/2010 | Witt ........................ A23J 1/125 435/68.1 |
| 2014/0288193 A1* | 9/2014 | Hansen ..................... C12P 7/10 514/773 |
| 2014/0308389 A1* | 10/2014 | Ames ...................... A23L 33/40 426/2 |
| 2016/0100610 A1* | 4/2016 | Vineyard ............... A23K 10/12 426/2 |

FOREIGN PATENT DOCUMENTS

| | | |
|---|---|---|
| DE | 10 2007 040 068 A1 | 2/2009 |
| EP | 0 213 023 A1 | 3/1987 |
| WO | WO 03/063609 A1 | 8/2003 |
| WO | WO 2008/009733 A2 | 1/2008 |

OTHER PUBLICATIONS

English translation of De Buhr et al., WO 2008/009733; translation from EPO Patent Translate, WIPO publication date Jan. 28, 2008. (Year: 2008).*

* cited by examiner

*Primary Examiner* — Walter A Moore

(57) ABSTRACT

The invention relates compositions rich in yeast proteins, methods for producing processing wheat for recovery of the compositions rich in yeast proteins, and uses thereof as animal feed.

13 Claims, No Drawings

METHOD FOR THE VALORISATION OF YEAST BIOMASS RESULTING FROM THE PRODUCTION OF ETHANOL

This application is a national stage of International Application No. PCT/FR2015/053088, filed on Nov. 16, 2015, which claims the benefit of French Patent Application 1461022, filed Nov. 14, 2014, the contents of each of which are incorporated herein by reference.

FIELD OF THE INVENTION

The present invention relates to the production of a dried yeast biomass, resulting from an ethanol fermentation process. More particularly, the present invention relates to a process which allows better exploitation of ethanol production coproducts.

PRIOR ART

The production of ethanol based on cereals has developed greatly throughout the world, in order to meet the desire to replace fuels of fossil origin with a renewable origin produced by agriculture.

The usual process starting from cereals consists of placing in an aqueous medium, enzymatic hydrolysis, fermentation using *Saccharomyces cerevisiae* and distillation. It generates ethanol, with respect to approximately one third of the dry matter, carbon dioxide with respect to another third of the dry matter, and the remainder is a coproduct that will generally be dried, so as to become spent distillation cereal grain intended to feed animals.

In the United States of America, the production of fuel ethanol is mainly based on corn and generates a spent corn grain, called "Corn DDGS" (Dried Distillers' Grains with Solubles).

In Europe, the production from cereals is mainly based on wheat, and generates a spent wheat grain. There is also a production of spent corn grain, or spent cereal grain, when the ethanol production is carried out from a mixture of various cereals (barley, rye, triticale, sorghum, oats, rice). It is possible to add a supplement in the form of starch of other origins (potato, cassava, sweet potato, pea), sugars from sweet plants (beetroot, sugarcane, chicory), or any other substrate that can be fermented by yeasts, either directly, or after hydrolysis.

The "Corn DDGs" and "Wheat DDGS" known from the prior art are however all very rich in fibers, and rich in vegetable proteins (in particular in gluten) and thus have a low content of essential amino acids, particular of lysine. In animal feed, the term "essential amino acids" is intended to mean those which are particularly required for the performance of livestock animals and are often deficient in animal rations: lysine, methionine, cystine, threonine, tryptophan, valine, arginine. Other amino acids may be useful for the animal, but considered to be non-essential since they are rarely deficient, such as glutamic acid.

The result is a poor economic exploitation of spent cereal grains, which are mainly used to feed ruminants (dairy cattle, beef cattle, sheep, goats), adult monogastric animals with low-protein needs, or fish and Crustacea of herbivorous type (carp, tilapia, shrimp). Spent cereal grains are used very little to feed animals with high protein needs: young livestock animals (piglets, calves, young poultry, young shrimp), dogs, cats, fish of carnivorous type (salmon, trout, bass, sea bream). These animals need a diet that is well balanced in terms of essential amino acids (lysine, methionine, threonine, tryptophan) in order to cover their requirement, to prevent intestinal losses of nitrogen which are sources of pollution, diarrhea, bad smells and disruption of the microbial flora of the colon.

However, there is a very advantageous fraction in the non-volatile part of the fermentation must: the yeast (in particular *Saccharomyces cerevisiae*) biomass.

The yeast biomass is well known from the prior art in human food and animal feed. It is a protein source of high quality, well balanced in terms of essential amino acids (for example brewer's yeast has a lysine content that is approximately two times higher compared with cereal proteins). The biomass of yeast, of *Saccharomyces cerevisiae* type, is recognized for its natural provision of group B vitamins, for its favorable effect on fiber digestion in herbivores (ruminants, horses, rabbits), for its beneficial effect on immunity, reduction of the harmful effects of mycotoxins, as a natural source of nucleotides or appetence factor for pets.

Yeast biomass is conventionally obtained during beer production, by filtration and then drying on a drum or spray-drying. It is thus a coproduct, which is not regularly available, and is dependent on beer production. Many breweries are not equipped to dry the liquid yeast, which will have to be transported over large distances in order to be dried.

Another way to produce yeast biomass is intentional production by fermentation on a substrate of carbohydrates (sucrose, starch hydrolyzate).

It is then a main product, and not a coproduct, the production cost of which is high, and which is not very accessible to the livestock animal feed and pet feed industry.

The authors of document FR 2 949 645, and also those of documents WO 2010/109203 and Use of cereal crops for food and fuel—Characterization of a novel bioethanol coproduct for use in meat poultry diets (Food and Energy Security, 2013, 2 (3), pp. 197-206) have proposed to improve the nutritional quality of DDGSs resulting from bioethanol production by attempting to isolate more particularly the yeast biomass. The two processes developed use whole cereals as vegetable raw materials. In other words, the processes comprise the conversion of a vegetable material rich in fibers and gluten. Consequently, the coproduct obtained according to these two processes always contains a high proportion of cereal proteins, the consequence of which is a low lysine content relative to total protein (less than 3 g of lysine per 100 g of protein).

Documents U.S. Pat. Nos. 2,698,826, 4,361,651, WO 03/063609 and DE 102007040068 describe processes for producing ethanol in which the fermentable musts are virtually free of residual fibers and of gluten.

Document EP 213023 describes a process for producing ethanol in which the fermentable must still comprises large amounts of fibers and of gluten. Because of the presence of large amounts of fibers in the fermentable must, the protein feed comprises a protein content of less than 25%. Furthermore, since all of the dry mass is recovered for the production of this protein feed and since no separation step is carried out before concentration then drying of this feed, it comprises large amounts of ash. This protein feed is similar to the DDGSs mentioned above.

Document WO 2008/0099733 describes, for its part, a process for producing ethanol in which a yeast milk having a dry mass of approximately 20% is recovered at the end of the fermentation and before distillation. This milk is evaporated under vacuum in order to recover the ethanol present. Part of this thick phase is further concentrated, recovered, and then dried as dry yeast. No separation step is carried out before concentration then drying of this yeast milk. All of the dry mass is thus recovered during the production of this dry yeast and it comprises, in particular, large amounts of ash.

The present invention relates to a process for producing ethanol, mainly based on cereals and more particularly on wheat, allowing optimum recovery of the yeast biomass, this yeast biomass having a low amount of ash and of vegetable proteins.

SUMMARY OF THE INVENTION

Thus, a first subject of the present invention is directed toward a process for recovering a composition rich in yeast proteins from a distillation residue resulting from ethanol production, comprising:
a) preparation of a fermentable must comprising at least 40% by dry weight of wheat starch dry matter;
b) enzymatic hydrolysis of the fermentable must;
c) fermentation of the hydrolyzate thus obtained;
d) distillation of the fermented product;
e) separation of the distillation residue so as to obtain
    a first fraction (A) rich in yeast proteins and containing residual fibers and
    a second fraction (B) comprising soluble products of the distillation residue;
f) drying of the fraction (A) so as to obtain a composition rich in yeast proteins; characterized in that the fermentable must comprises less than 10% of vegetable proteins and a residual fiber content of between at least 3% and at most 6%.

A second subject of the present invention relates to a composition rich in yeast proteins, which composition can be obtained according to the process which is the subject of the present invention.

A third subject of the present invention is directed toward an animal feed comprising said composition rich in yeast proteins.

DETAILED DESCRIPTION OF THE INVENTION

In the present invention, the term "fibers" corresponds to the plant walls of cereals, in particular of wheat. They comprise in particular brans.

The term "residual fibers" denotes the fibers which are not removed during the preparation of the starch milk. The residual fibers comprise mainly the internal fibers of the cereals, in particular of the wheat, such as pentosans (mainly arabinoxylans), but can also comprise residual brans.

The residual fiber content is determined according to the AFNOR method NF V18-122: 1997, which consists of a treatment through the action of dodecyl sulfate in a neutral medium with the use of enzymes: an alpha-amylase (termamyl 120 L) and a protease (pronase). This content is expressed as percentage of Neutral Detergent Fiber relative to dry matter.

In the present invention, the term "yeast proteins" means the proteins derived from yeasts, both those originating from the yeasts introduced into the step of fermentation of the starch hydrolyzate and those generated during the growth and multiplication of the yeasts (*Saccharomyces cerevisiae*). Since the yeast protein content in a sample cannot be directly measured, it is determined, in the present invention, from the lysine content. This is because the process according to the invention involves only vegetable proteins, in particular derived from wheat, and yeast proteins, in particular derived from *Saccharomyces cerevisiae*. Moreover, *Saccharomyces cerevisiae* proteins generally contain 6.1% of lysine and wheat proteins generally contain 2.9% of lysine. Thus, for the purposes of the present invention, the yeast protein content can be determined from the lysine content using the following formula (1):

$$\% \text{ yeast} = (\% \text{ lysine} - 2.9)/(6.1-2.9) \quad (1)$$

In which, % yeast represents the percentage of yeast protein relative to the total proteins in the sample; and % lysine represents the percentage of lysine relative to the total proteins in the sample.

In the present invention, the term "vegetable proteins" denotes the proteins derived from vegetable sources, in particular wheat, such as gluten. In the case of the fermentable must, the vegetable protein content corresponds to the total protein content.

In the present invention, the total protein content is obtained by multiplying the total nitrogen content by the coefficient 6.25. The total nitrogen content is determined by the Dumas method according to AFNOR standard NF V18-120: 1997. This content is expressed as percentage by weight relative to the total dry matter.

In the present invention, the lysine content is determined according to a method consisting of an acid hydrolysis (6N HCl) (24 h at 115° C.) followed by a chromatography analysis.

Unless otherwise indicated, in the present invention, the percentages indicated are expressed by dry weight relative to the total dry matter.

Step a) of the process according to the invention consists in preparing a fermentable must.

The fermentable must comprises at least 40% by weight, preferably at least 50% by weight, more preferentially at least 70% by weight, even more preferentially 90% by weight of wheat starch. In one particular embodiment, the fermentable must comprises exclusively starch derived from wheat.

The wheat starch is typically introduced into the fermentable must in the form of a wheat starch milk. For the purposes of the present invention, the term "wheat starch milk" is intended to mean a non-purified wheat starch milk, that is to say a wheat starch milk comprising in particular a certain amount of residual fibers and wheat proteins. By way of example, a starch milk according to the invention generally comprises at least 75% of starch, 2% to 8% of residual fibers and 3% to 6% of vegetable proteins. The starch milk generally also comprises ash, sugars and lipids.

Thus, step a) advantageously comprises a step of preparation of a wheat starch milk. The methods for preparing starch milk are well known to those skilled in the art. They can in particular comprise fiber-removing and gluten-removing steps.

Typically, the preparation of the wheat starch milk according to the invention comprises separation of the fibers by milling and sieving of the wheat grains and separation of the gluten by leaching. More particularly, the wheat starch milk is obtained from the wheat grains by:
    preparation of a milled wheat flour by milling the wheat grains;
    dry separation of the fibers (in particular the brans), and optionally of the germs, in particular by sieving;
    hydration of the milled flour so as to obtain a paste;
    separation of the gluten by leaching.

It is essential for the fermentable must to comprise wheat starch. This is because this starch comprises residual fibers which make it possible to obtain the composition of the invention. However, the fermentable must may comprise starches originating from sources other than wheat, such as corn, rye, barley, oat, triticale, spelt, millet, sorghum, horse bean, potato, sweet potato, rice, *quinoa*, chestnut, lentil, chickpea, bean, broad bean, cassava or buckwheat starch, or mixtures thereof.

The fermentable must may also comprise a supplement of fermentable materials. The additional sources of fermentable materials are preferably sugars or glucose syrups resulting from the hydrolysis of starch or of sucrose. Those skilled in the art will be able to use these optional additional constituents in amounts which make it possible to obtain the fermentable must of use in the invention, in particular with regard to the amounts of starch, of vegetable proteins and of residual fibers.

The fermentable must has a reduced content of vegetable proteins (in particular of gluten) and of fibers. The fermentable must comprises less than 10% of vegetable proteins and from 3% to 6% of fibers. The fermentable must preferably comprises less than 5% of vegetable proteins.

It also still contains soluble (non-gluten) proteins and non-starchy carbohydrates such as gums (in particular pentosans).

Step b) of the process according to the present invention consists in hydrolyzing the fermentable must.

This step is well known to those skilled in the art. The hydrolysis is carried out enzymatically. The enzymes used break the glucide bonds of the starch macromolecule in order to obtain sugars that can be assimilated by the yeast.

More specifically, the release of glucose by enzymatic hydrolysis takes place in two steps: liquefaction and saccharification.

It involves, firstly, bringing the fermentable must into contact with a liquefaction enzyme, in particular an alpha-amylase, in proportions and under conditions (pH, temperature) that those skilled in the art will know how to adjust.

In order to ensure optimum operation of the liquefaction enzyme, the pH of the fermentable must is preferably fixed at between 5 and 6 (adjustment with sodium hydroxide and/or aqueous ammonia if required) and the temperature is maintained between 80° C. and 95° C. during the contact time, preferably of two hours.

The liquefied must thus obtained is then cooled and its pH is adjusted in order to be subjected to the enzymatic saccharification treatment.

In order to ensure optimum operation of the saccharification enzyme, the temperature of the liquefied must is between 55° C. and 65° C. and the pH is brought to between 4 and 5 (by adding for example sulfuric and phosphoric acid).

The saccharification step consists in bringing the liquefied must into contact with one or more enzymes in combination. Among the enzymes that can be used during this step, mention may be made of the saccharifying enzymes: amylases (alpha and beta-amylases), glucoamylases, pullulanases, maltases and also proteases, hemicellulases, cellulases, xylanases, beta-glucanases, lipases and lysophospholipase. The latter are not termed saccharifying, but make it possible to facilitate the action of the saccharifying enzymes by acting on proteins, lipids, complex sugars and fibers, with a notable effect on the viscosity of the medium. Even though the conversion of the fibers into sugars remains limited at this stage, this enzymatic action will give fibers that are more readily fermentable when they are used as animal feed.

Those skilled in the art will know how to adjust the dosage of the enzymes, the pH and temperature conditions and also the contact time.

The starch hydrolyzate thus obtained is then cooled before undergoing a fermentation step. The cooling may be carried out for example using plate exchangers (surface water) at a temperature of between 30° C. and 40° C.

Step c) of the process consists in carrying out the starch hydrolyzate fermentation.

During this step, the carbohydrates, mainly glucose, are converted, in an anoxic medium, to ethanol and carbon dioxide.

The fermentation, which is a step well-known to those skilled in the art, can be carried out batchwise or continuously.

The yeast used for the fermentation can be chosen from *Saccharomyces, Schizosaccharomyces, Brettanomyces, Schwanniomyces, Candida* and *Pichia*, and is preferably *Saccharomyces cerevisiae*.

Air and nitrogen are added at the beginning of fermentation. Such provisions make it possible to ensure yeast multiplication and, consequently, protein production.

Nitrogen is particularly required because of the separation of the gluten and other vegetable proteins at the beginning of the process. It is added to the fermentation medium preferably in the form of urea in solution.

Other nitrogen sources can be envisioned. By way of example, mention may be made of ammonia, ammonium salts, nitrates, (concentrated) steep liquors, and yeast extracts.

The amount of nitrogen introduced is preferably such that it is totally converted into yeast biomass, and thus that the amount of inorganic nitrogen exiting fermentation is virtually zero.

Sources of phosphorus and sulfur, provided for example in acid form, can also be added at the beginning and/or in the middle of the fermentation in order to regulate the pH.

Those skilled in the art will know how to adjust the dosage of the enzymes, the pH and temperature conditions and also the contact time. That said, the temperature of the fermenters is preferably maintained at a value of between 25 and 35° C. and the pH is maintained at a value of between 3.4 and 4.4.

At the end of fermentation, the anaerobic conditions must be adhered to in order to favor the conversion of the glucose into ethanol.

An increase in the alcohol content and, conversely, a drop in the glucose content then occur. The fermentation is thus controlled according to the residual alcohol, sugar and starch contents. Other metabolites resulting from the fermentation are also formed, such as glycerol or organic acids. It is desirable to maintain the amount of these metabolites at the lowest possible level so as to obtain a better alcohol yield. The fermentation time can be adjusted with the output flow rate of the final fermenter toward the distillation columns. The ethanol content at the end of fermentation generally reaches 80 to 110 g/l.

The fermentation gases from the non-aerated fermenters are recovered. Thus, it will be possible to exploit the carbon dioxide. After purification and liquefaction, it will be possible, for example, for the carbon dioxide to be used in food applications (fizzy drinks) or industrial applications.

Step d) of the process according to the invention consists in carrying out the distillation of the fermented product.

The distillation makes it possible to separate the ethanol produced during the fermentation in the form of an azeotropic mixture with the water containing up to 95/96 vol % of ethanol.

The crude ethanol recovered after condensation of the vapors resulting from the columns may be advantageously dehydrated on molecular sieve (for example zeolite) and concentrated to 99.9 vol %.

At the end of this distillation, on the one hand, a fraction containing the ethanol and, on the other hand, a distillation residue or vinasses are obtained.

The distillation residue according to the present invention contains:
- insoluble compounds: residual cereal fibers and yeast cells in particular (easily observable under a microscope), and
- soluble matter: proteins (albumins, globulins originating essentially from wheat), glycerol, partially or non-hydrolyzed sugars, mineral elements originating from the raw materials or added during the fermentative phase.

The dry matter content of the distillation residue is generally between 3% and 6%.

The distillation residue generally comprises, relative to the total amount of the residue, an amount of ethanol of less than 0.5%.

In the process which is the subject of the present invention, and contrary to the majority of the processes for producing ethanol from cereals described in the literature, the smaller amount of dry matter of the distillation residue is explained by the fact that the fermentable must is free of gluten and also of the majority of the fibers (in particular of the wheat brans).

The distillation residue exhibits between 18% and 22% of total proteins on a dry matter basis. This fraction contains few vegetable proteins and therefore predominantly yeast proteins. This is corroborated by the high lysine content (greater than 5% on a dry basis relative to the total protein). This is totally different than the usual processes based on cereals, which result in a distillation residue containing little yeast and predominantly cereal proteins, gluten in particular.

Step e) of the process consists in separating the distillation residue so as to obtain:
- a first fraction (A) rich in yeast proteins and fibers,
- and a second fraction (B) comprising soluble products of the distillation residue.

This separation step is preferably carried out by mechanical separation, in particular by decanting, centrifugation or filtration. By way of example of equipment for mechanical separation by centrifugation, mention may be made of nozzle centrifuges and disk bowl centrifuges. By way of example of equipment for separation by filtration, mention may be made of belt filters, disk filters, sieves and filtering membranes. Preferably, the separation is carried out by decanting, and more particularly using a horizontal decanter.

The fraction (A) typically comprises at least 50%, preferably between 70% and 99%, of yeast proteins relative to the total proteins in the fraction (A).

The fraction (A) typically comprises from 40% to 60%, preferably from 45% to 55%, of residual fibers.

More specifically, the fraction (A) is composed of 25% to 35% of dry matter, and comprises between 40% and 50%, more preferentially 45%, of residual fibers, between 25% and 35%, more preferentially 30%, of proteins (comprising at least 50%, preferably between 70% and 90%, of yeast proteins relative to the total proteins), between 5% and 15%, preferably 10%, of lipids and between 1% and 5%, preferably 2%, of ash. Because of the presence of the residual fibers, this fraction has a solid structure, and more particularly is in the form of a paste. The fraction (A) generally comprises, relative to the total amount of this fraction, an amount of ethanol of less than 0.1%.

Without wanting to be bound by any theory, the applicant thinks that the residual fibers present in the distillation residue trap the yeasts in suspension. Thus, contrary to the conventional processes, the yeasts are mainly in the insoluble fraction. It is thus possible to separate the yeasts from the soluble products more easily.

The fraction (B) which contains the majority of the soluble products of the distillation residue exhibits from 3% to 5% of dry matter and comprises in particular glycerol, partially or non-hydrolyzed sugars, 15% to 25%, preferably 20%, of soluble peptides and proteins such as albumin and globulin, and also minerals (between 3% and 8%, preferably 5%). This fraction may be evaporated so as to obtain a nutritive liquid for livestock animals (mainly pigs being fattened up, dairy cattle and beef cattle), or co-dried on a wheat bran support.

Since the fermentable must used in the process according to the invention is virtually free of gluten and also of the majority of the cereal fibers, contrary to most of the processes described in the prior art, a single separation step is sufficient to obtain a fraction (A) rich in yeast proteins, and with a low content of reducing sugars (free glucose and fructose less than 2% on a dry matter basis) and mineral elements or soluble salts.

At the end of step e), the fraction (A) represents approximately ⅓ by weight on a dry matter basis of the total amount of dry matter of the distillation residue and the fraction (B) represents the remaining ⅔.

Step f) of the process consists in drying the fraction (A) so as to obtain, as final coproduct, a composition rich in yeast proteins.

The drying step can be carried out using rotary drum dryers, fluidized bed dryers, disk or plate dryers, screw dryers, vane dryers, conveyor belts, pneumatic dryers, flash dryers or dispersion dryers. Preferably, the dryer used is a dispersion dryer.

A dispersion dryer is a pneumatic transport dryer with a dispersion system, more particularly a hot air circulation dryer. The fraction (A) is typically in the form of a paste; the dispersion system fragments the pasty product, allowing an increase in the exchange surface and thus an increase in the evaporative capacity. Furthermore, the product is in contact only with low-temperature warm air streams (the temperature of the air inside the drying chamber does not exceed 100° C.). Preferably, the product is dried in the drying chamber for a contact time of less than 30 seconds. Thus, the product is exposed only to very weak thermal stresses, which makes it possible to considerably reduce the degradation of the proteins, in particular due to the Maillard reaction. Use may in particular be made of a dispersion dryer chosen from those of the Hosokawa Micron Corporation brand of Drymeister DMR-H type, of the Allgaier® brand of FL-T type and of the Bepex brand of PCX type.

The composition obtained at the end of this drying step is in the form of a fluid, pulverulent composition which is non-dusty and easy to use in the factory.

The composition preferably has a particle size of between 100 and 1000 microns and a residual moisture content of less than 10%, preferably of between 5% and 7%. At this moisture content, the composition has an Aw (water activity) of less than 0.7, preferably less than 0.5, making it possible to limit the proliferation of microorganisms (growth of molds, yeasts and bacteria) and also to limit physicochemical degradations and enzymatic activity.

A subject of the present invention relates to a composition rich in yeast proteins, which composition can be obtained according to the process defined above.

The composition obtained at the end of the process which is the subject of the present invention has:
- a total protein content of 25% to 35%;
- a high essential amino acid content and in particular a lysine content greater than 4 g/100 g of proteins, preferably between 4 and 8 g/100 g of proteins and more preferentially of 6 g/100 g of proteins;
- an ash content of less than 3%, on average 2%, making possible use at a high content in feeds for species sensitive to excess minerals (young animals, domestic carnivores, alevins);
- a residual fiber content of between 40% and 50%, which constitutes a good support for intestinal fermentations;
- a lipid content of between 8% and 12%, preferably of 10%, conferring a good energy value on the product;
- a low reducing sugar content, of less than 2%.

The typical amino acid profile of the composition obtained at the end of the process which is the subject of the present invention is the following:

|  | g/100 g of proteins | g/100 g of raw product |
|---|---|---|
| Total proteins N 6.25 |  | 26.6 |
| Aspartic acid | 7.5 | 2.0 |
| Threonine | 4.2 | 1.12 |
| Serine | 4.9 | 1.3 |
| Glutamic acid | 16.5 | 4.38 |
| Glycine | 4.8 | 1.28 |
| Alanine | 5.2 | 1.38 |
| Valine | 5.6 | 1.48 |
| Isoleucine | 4.1 | 1.09 |
| Leucine | 7.7 | 2.0 |
| Tyrosine | 3.5 | 0.9 |
| Phenylalanine | 4.4 | 1.16 |
| Lysine | 5.6 | 1.5 |
| Histidine | 2.5 | 0.67 |
| Arginine | 6.3 | 1.67 |
| Proline | 6.1 | 1.61 |
| Cystine | 1.9 | 0.51 |
| Methionine | 1.8 | 0.49 |
| Tryptophan | 1.4 | 0.37 |

Thus, the composition obtained at the end of the process which is the subject of the present invention has nutritional properties that are very different than all the products already described in the literature, resulting from fermentation and distillation of cereals, including the products called Yeast Protein Concentrate, the amino acid profile of which is more reminiscent of a cereal protein than of a yeast protein. These products in fact generally contain approximately 2 g of lysine per 100 g of protein.

The present invention also relates to a composition rich in yeast proteins, comprising:
- a total protein content of between 25% and 35%;
- a fiber content of between 40% and 50%;
- a lipid content of between 8% and 12%;
- a reducing sugar content of less than 2%;
- an ash content of less than 3%.

The composition rich in yeast proteins of the present invention has the advantage of being easily digestible by animals, as demonstrated in the examples hereinafter, and in particular by young livestock animals (piglets, calves, young poultry, young shrimp), dogs, cats, fish of carnivorous type (salmon, trout, bass, sea bream).

The composition rich in yeast proteins typically comprises between 4 and 8 g of lysine per 100 g of protein. This content is particularly advantageous since lysine is the first limiting factor. Thus, it comprises very few vegetable proteins, in particular very little gluten. It is preferably free of gluten.

Preferably, the composition rich in yeast proteins has a lysine digestibility greater than 65%, or even greater than 70%.

Preferably, the composition rich in yeast proteins has a methionine digestibility greater than 70%, or even greater than 75%.

The digestibility of the amino acids can be measured according to the protocol described in the publication by Cozannet et al., Journées de la Recherche Porcine, 41, 117-130, 2009, Valeur nutritionnelle des drêches de blé européennes chez le porc en croissance [Nutritional value of European spent wheat grains in growing pigs].

Preferably, the composition rich in yeast proteins can be obtained according to the process defined above.

In addition to good nutritional properties, this composition has a pleasant odor and is not bitter.

One of the reasons explaining these organoleptic properties is that the composition rich in yeast proteins generally comprises, relative to the total dry mass of said composition, an amount of ethanol of less than 0.1%, or even less than 0.05%.

Thus, the composition can be used as a brewer's-yeast substitute. It can in particular be used in many animal feed applications, including for animal species which have a very selective appetence (in particular in horses). More particularly, the composition may be incorporated into animal feeds, used for the production of nutritional specialty products for livestock animals or as appetence factors for pets, or incorporated at the surface of the usual food ration (according to top feeding technology). This is particularly advantageous since DDGSs cannot be used satisfactorily for pets or young livestock animals because of their low protein quality (few essential amino acids relative to the total amount of proteins) and their low digestibility. Conversely, the composition of the invention has the advantage of being able to be used for feeding pets, in particular in the form of extruded dry pet food, of treats, or even in pâtés. It can also be used in feeds for young livestock animals, for example in the form of complete feeds which can be in powder or granulated form.

A subject of the invention is thus also an animal feed comprising the composition rich in yeast proteins which is the subject of the present invention.

EXAMPLES

Example 1: Production of the Composition According to the Invention

A fermentable must based on wheat starch comprising 4% of gluten and 4% of residual fibers is prepared.

The pH of the fermentable must is fixed at 5.5. After explosion of the starch by steam injection under pressure, the temperature is maintained at 90° C. for a contact time of two hours.

The liquefied must thus obtained is then placed at 60° C. and its pH is adjusted to 4.5 in order to be subjected to the enzymatic saccharification treatment.

A glucoamylase and a pullulanase are added in addition to the alpha-amylase.

The hydrolyzed starch thus obtained consist mainly of glucose.

Before carrying out the fermentation step, cooling to a temperature of 35° C. is performed. The *Saccharomyces cerevisiae* yeast is introduced so as to convert, in an anoxic medium, into ethanol and carbon dioxide.

Air and urea are added at the beginning of fermentation and the pH is maintained at a value of 4. At the end of fermentation, the system is maintained under anaerobic conditions. The ethanol content at the end of fermentation is 100 g/l.

The fermented product is then distilled. The distillation makes it possible to separate, on the one hand, the ethanol and, on the other hand, a distillation residue having a dry mass of 5%.

The distillation residue exhibits approximately 20% of total proteins on a dry matter basis. This fraction contains few vegetable proteins and therefore predominantly yeast proteins and an amount of lysine, relative to the total mass amount of proteins, of greater than 5% on a dry matter basis.

The distillation residue is then separated using a horizontal decanter, so as to obtain:
a first fraction (A) rich in fibres and yeast proteins,
and a second fraction (B) comprising soluble products of the distillation residue.

At the end of the separation step, the fraction (A) represents ⅓ by weight on a dry matter basis of the total amount of dry matter of the distillation residue and the fraction (B) represents the remaining ⅔.

The fraction (A) is in the form of a paste composed of 30% of dry matter, and comprises 45% of residual fibers, 30% of proteins (of which 85% of yeast proteins relative to the total proteins), 10% of lipids and 2% of ash.

The fraction (A) is then dried by introducing the paste obtained into a dispersion dryer, the interior of the heating chamber of which is regulated at 90° C. (contact time in the drying chamber less than 30 seconds).

The composition according to the invention is obtained in the form of a pulverulent composition, having a residual moisture content of 5%.

The amounts of amino acids in the composition, expressed by dry mass relative to the total dry matter of protein, after drying are reproduced in the table below. These amounts of amino acids of the lyophilized fraction (A) are also reproduced.

| AMINO ACIDS | lyophilized product | product dried on dispersion dryer |
|---|---|---|
| Aspartic Acid | 7.30 | 7.40 |
| Threonine | 4.10 | 4.10 |
| Serine | 5.30 | 5.30 |
| Glutamic Acid | 20.40 | 20.10 |
| Glycine | 4.90 | 4.90 |
| Alanine | 4.90 | 5.00 |
| Valine | 5.40 | 5.50 |
| Isoleucine | 4.20 | 4.30 |
| Leucine | 8.10 | 8.20 |
| Tyrosine | 3.60 | 3.70 |
| Phenylalanine | 4.60 | 4.70 |
| Lysine | 5.40 | 5.40 |
| Histidine | 2.50 | 2.50 |
| Arginine | 6.20 | 6.20 |
| Proline | 7.50 | 7.30 |
| Cystine | 2.20 | 2.30 |
| Methionine | 1.90 | 1.70 |
| Tryptophan | 1.40 | 1.40 |

The comparison of the lyophilized composition with the dried composition shows that no protein degradation takes place during the drying step.

Example 2: Verification of the Spontaneous Consumption of the Composition Rich in Yeast Protein According to the Present Invention Experimental Plan of Action:
52 adult horses in individual boxes (28 geldings, 24 mares) were fed for 4 consecutive days.

Distribution of the usual concentrate ration, said usual ration consisting of a mixture of barley, oats, dehydrated alfalfa, and minerals) with in addition 50 g (deposited at the surface) of the composition rich in yeast protein according to the present invention or of control pure brewer's yeast. (Provision by Top-Feeding).

In order to prevent artefacts due to the characteristics of the horses, each of the horses was fed with the composition rich in yeast protein and with the brewer's yeast according to the following scheme:
26 horses were fed with the composition according to the present invention for the first two days and then with the control brewer's yeast for the next two days; and
26 horses were fed with the control brewer's yeast for the first two days and then with the composition according to the present invention for the next two days.

Consumption grade 15 min after distribution:
Grade 1→Total consumption.
Grade 0→Remainder of the powder unconsumed.
Results:

| Average grade on 10 | Day 1 | Day 2 | Day 3 | Day 4 |
|---|---|---|---|---|
| Control brewer's yeast | 2.3 | 4.6 | 5.7 | 6.9 |
| Composition according to the present invention | 6.1 | 8.8 | 7.3 | 8.5 |

The spontaneous consumption during the first day is much better for the composition according to the present invention compared with the control brewer's yeast. During the following days, acceptance improves for the 2 products, but remains greater for the composition of the present invention compared with the control yeast.

The spontaneous consumption of the composition which is the subject of the present invention is better than the brewer's yeast.

Example 3: Digestibility of the Proteins of the Composition Rich in Yeast Protein According to the Present Invention A representative sample of the composition was used to perform a measurement of amino acid digestibility "in vivo", on growing pigs.

The protocol used and the research station are identical to that which is described in the 2009 publication, Journées de la Recherche Porcine, 41, 117-130, Valeur nutritionnelle des drêches de blé européennes chez le porc en croissance [Nutritional value of European spent wheat grains in growing pigs] (Station de Recherche [Research Station] Arvalis—France).

The amino acid composition results, and the standardized ileal digestibility coefficients of said amino acids, are presented in the table below, in comparison with the average of the 10 European spent wheat grains collected during the summer of 2007, and of the values of the INRA/AFZ 2002 table, dehydrated brewer's yeast.

|  | Average of 10 European spent wheat grains J.R.P. 2009 | Composition of the present invention Study ARVALIS 2015 | Dehydrated brewer's yeast INRA/AFZ 2002 |
|---|---|---|---|
| Composition on product as such |  |  |  |
| % Dry Matter | 92.6 | 93.9 | 93.3 |
| % Proteins (total nitrogenous matter N. 6.25) | 33.7 | 27.6 | 46.5 |
| % Minerals | 4.9 | 1.4 | 7.1 |
| % Fats | 4.3 | 8.4 | 3.9 |
| Amino acids g/100 g of protein |  |  |  |
| Lysine | 1.91 | 5.37 | 6.1 |
| Methionine | 1.43 | 1.77 | 1.5 |
| Cystine | 1.76 | 1.84 | 0.6 |
| Threonine | 2.95 | 3.98 | 4.3 |
| Tryptophan | 1.05 | 1.26 | 1.0 |
| Arginine | 3.76 | 5.85 | 4.4 |
| Valine | 4.22 | 5.27 | 4.7 |
| Standardized ileal digestibility coefficient, pigs % |  |  |  |
| Lysine | 55.7 | 72.6 | 74 |
| Methionine | 72.0 | 80.4 | 69 |
| Cystine | 77.2 | 75.3 | 49 |
| Threonine | 74.9 | 70.6 | 66 |
| Tryptophan | 77.3 | 69.4 | 55 |
| Arginine | 83.0 | 81.0 | 78 |
| Valine | 74.3 | 75.1 | 66 |

The table above demonstrates that the composition of the present invention is much richer in total lysine than the usual coproduct of spent wheat grain ethanol (5.37 compared with 1.91 g/100 g of protein) and that this lysine is more digestible (72.6% compared with 55.7%).

The lysine content relative to crude protein of the present invention is similar to that of the brewer's yeast (5.37 compared with 6.1 g/100 g), with an equivalent digestibility (72.6% compared with 74%).

The invention claimed is:

1. A process for recovering a composition rich in yeast proteins from a distillation residue resulting from ethanol production, comprising:
   a) preparing a fermentable must comprising at least 40% by weight of wheat starch, less than 10% of vegetable proteins and between 3% and 6% of fibers;
   b) enzymatically hydrolyzing the fermentable must to produce a hydrolyzate;
   c) fermenting the hydrolysate;
   d) distilling the fermented product of step c) to obtain a distillation residue;
   e) separating the distillation residue so as to obtain: a first fraction (A) rich in yeast proteins and containing the fibers; a second fraction (B) comprising soluble products of the distillation residue; and
   f) drying of the fraction (A) so as to obtain the composition rich in yeast proteins,
   wherein the composition rich in yeast proteins comprises a total protein content of between 25% and 35%; a fiber content of between 40% and 50%; a lipid content of between 8% and 12%; a reducing sugar content of less than 2%; and an ash content of less than 3%.

2. The process according to claim 1, wherein step a) comprises preparing a wheat starch milk comprising:
   removal of fibers by milling and sieving; and
   removal of gluten by leaching.

3. The process of claim 2, wherein step a) further comprises introducing the wheat starch milk into the fermentable must.

4. The process of claim 2, wherein the wheat starch milk comprises at least 75% of starch, 2% to 8% of residual fibers and 3% to 6% of vegetable proteins.

5. The process according to claim 1, wherein the fermentable must further comprises starch originating from sources other than wheat, and selected from corn, rye, barley, oat, triticale, spelt, millet, sorghum, horse bean, potato, sweet potato, rice, *quinoa*, chestnut, lentil, chickpea, bean, broad bean, cassava or buckwheat, or mixtures thereof.

6. The process according to claim 1, wherein the fermentable must further comprises a supplement of fermentable materials comprising sugars resulting from a starch hydrolysis or glucose syrups resulting from a starch hydrolysis.

7. The process according to claim 1, wherein the fermentable must comprises exclusively wheat starch milk.

8. The process according to claim 1, said separating is carried out using a decanting device.

9. The process according to claim 8, wherein said decanting comprises using a horizontal decanter.

10. The process according to claim 1, comprising drying fraction (A) in a dispersion dryer.

11. The process according to claim 1, wherein said fermenting is conducted batchwise or continuously.

12. The process of claim 1, wherein the fermenting is conducted in the presence of a yeast selected from one of *Saccharomyces*, *Schizosaccharomyces*, *Brettanomyces*, *Schwanniomyces*, *Candida* and *Pichia*.

13. The process of claim 1, wherein the fermenting is conducted at a temperature of between 25 and 35° C.

* * * * *